(12) United States Patent
Feltham et al.

(10) Patent No.: US 10,771,311 B2
(45) Date of Patent: ***Sep. 8, 2020

(54) COMMUNICATION OF EVENT MESSAGES IN COMPUTING SYSTEMS

(71) Applicant: International Business Machines Corporation, Armonk, NY (US)

(72) Inventors: Andrew S. Feltham, Chandlers Ford (GB); Colin I. Holyoake, Braishfeld (GB); Elizabeth J. Maple, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/249,175

(22) Filed: Jan. 16, 2019

(65) Prior Publication Data

US 2019/0149395 A1 May 16, 2019

Related U.S. Application Data

(63) Continuation of application No. 15/231,064, filed on Aug. 8, 2016, now Pat. No. 10,263,831.

(51) Int. Cl.
*H04L 12/24* (2006.01)
*H04L 12/26* (2006.01)
(Continued)

(52) U.S. Cl.
CPC .......... *H04L 41/06* (2013.01); *H04L 43/0811* (2013.01); *H04L 45/22* (2013.01); *H04W 4/80* (2018.02); *H04W 4/06* (2013.01)

(58) Field of Classification Search
CPC ..... H04L 41/06; H04L 43/0811; H04L 45/22; H04W 4/80; H04W 4/06
See application file for complete search history.

(56) References Cited

U.S. PATENT DOCUMENTS 6,243,838 B1 6/2001 Liu et al.
9,491,765 B1 11/2016 Petrick
(Continued)

FOREIGN PATENT DOCUMENTS

| JP | 3102349 B2 | 10/2000 |
| JP | 2011221911 A | 11/2011 |
| WO | WO2015086668 | 6/2015 |

OTHER PUBLICATIONS

LI-FI Technology: Transmission of Data Through Light Authors: Sharma, Rahul R; Raunak; Sanganal, Akshay Source: International Journal of Computer Technology and Applications, Jan./Feb. 2014, p. 150.
(Continued)

*Primary Examiner* — Blake J Rubin
(74) *Attorney, Agent, or Firm* — Schmeiser, Olsen & Watts, LLP; Mark Vallone

(57) ABSTRACT

A method and system. A first computer device sends to a second computer device, via a broadcast or multicast communication, an event notification of a notifiable management event, The first computer device may connect to a management network via only a first network switch, wherein the first computer device is unable to notify a management device of the notifiable management event via the management network because the first computer device is unable to connect to the management network via the first network switch. The first computer device receives, from the second computer device via a first unicast communication, an acknowledgment of the event notification, wherein the second computer device is able to connect to the management network via the second network switch. The broadcast or multicast communication and the first unicast communication each use a short-range wireless communications tech-
(Continued)

nology comprising visible light communication or data-over-audio communication.

20 Claims, 9 Drawing Sheets

(51) Int. Cl.
*H04L 12/707* (2013.01)
*H04W 4/80* (2018.01)
*H04W 4/06* (2009.01)

(56) References Cited

U.S. PATENT DOCUMENTS

| | | | |
|---|---|---|---|
| 9,600,983 | B1 | 3/2017 | Lydecker et al. |
| 2006/0031447 | A1 | 2/2006 | Holt et al. |
| 2008/0313539 | A1 | 12/2008 | McClelland et al. |
| 2010/0076607 | A1 | 3/2010 | Ahmed et al. |
| 2010/0129087 | A1 | 5/2010 | Kim et al. |
| 2011/0150492 | A1 | 6/2011 | Davidson |
| 2012/0106977 | A1 | 5/2012 | Ma et al. |
| 2012/0155885 | A1* | 6/2012 | Hannah ............... H04B 10/1143 398/128 |
| 2013/0031399 | A1 | 1/2013 | Watson |
| 2014/0134947 | A1 | 5/2014 | Stouder-Studenmund |
| 2014/0176947 | A1 | 6/2014 | Hesketh |
| 2014/0277784 | A1 | 9/2014 | Mick et al. |
| 2014/0309753 | A1 | 10/2014 | Crepet |
| 2015/0003832 | A1 | 1/2015 | Yamasaki et al. |
| 2015/0012623 | A1 | 1/2015 | Jubran et al. |
| 2015/0256386 | A1* | 9/2015 | Palmer ................. H04L 41/0803 709/220 |
| 2015/0311952 | A1 | 10/2015 | Varma et al. |
| 2016/0105317 | A1 | 4/2016 | Zimmermann et al. |
| 2016/0173199 | A1* | 6/2016 | Gupta ................. H04B 10/1149 398/127 |
| 2017/0041886 | A1 | 2/2017 | Baker et al. |
| 2017/0063566 | A1 | 3/2017 | Seminario et al. |
| 2017/0215038 | A1 | 7/2017 | Primm et al. |
| 2017/0262797 | A1 | 9/2017 | Wicks et al. |
| 2017/0344354 | A1 | 11/2017 | Schiefelbein et al. |
| 2018/0006723 | A1 | 1/2018 | Noh et al. |
| 2018/0041377 | A1 | 2/2018 | Feltham et al. |
| 2019/0327780 | A1* | 10/2019 | Ganguly ............... H04W 40/20 |

OTHER PUBLICATIONS

Office Action (dated Jul. 23, 2018) for U.S. Appl. No. 15/231,064, filed Aug. 8, 2016.
Amendment (dated Oct. 16, 2018) for U.S. Appl. No. 15/231,064, filed Aug. 8, 2016.
Notice of Allowance (dated Nov. 28, 2018) for U.S. Appl. No. 15/231,064, filed Aug. 8, 2016.

\* cited by examiner

COMMUNICATION OF EVENT MESSAGES IN COMPUTING SYSTEMS

This application is a continuation application claiming priority to Ser. No. 15/231,064, filed Aug. 8, 2016.

TECHNICAL FIELD

The present invention relates to computing systems, and more specifically, to the management of computing systems.

BACKGROUND

Computing systems comprising computer devices connected by data communications networks increasingly are growing in scale to meet consumer demand. In large-scale computing systems, computer devices and associated cabling and hardware may be located in large computer rooms and data centers in specially designed storage cabinets or racks that allow access thereto by operators, such as maintenance staff. The arrangement of storage cabinets in a computer room may be based on a number of design considerations. Such considerations include: topology design relating to the overall use of space within the room; general infrastructure design relating to the arrangement of mechanical systems (e.g., cooling systems) and electrical systems (e.g., power system) within the room, and technology infrastructure design relating to the arrangement of the computer systems hardware, communications network cabling etc., within the room.

Typically, computer rooms arrange storage cabinets in rows, in which pairs of rows of storage cabinets are arranged with their fronts facing opposite each other with an aisle in between, to allow for access by maintenance staff, as shown in FIG. 1A which is a schematic diagram of an arrangement of part of a computing system in a computer room showing an example technology infrastructure design. One such design concept that may be used in data centers is the so-called "hot aisle/cold aisle layout", which comprises rows of storage cabinets spaced by alternate "hot aisles" and "cold aisles", as shown in FIG. 1B which is schematic diagram of an arrangement of part of a computing system in a computer room showing an example general infrastructure design. In FIG. 1B, the fronts of rows of cabinets face into a cold aisle and the backs of rows of cabinets face into a hot aisle. A cooling system is arranged to control the flow of air around the cabinets for heat dissipation, so as to prevent overheating. In particular, the cooling system may be arranged to provide cold air into the fronts of the cabinets, and thus in front of the computing devices in the cabinets, via the "cold aisles". For example, as shown in FIG. 1B, cold air may flow from the floor of the cold aisles and into the fronts of the adjacent rows of cabinets as shown by arrows shaded as "cold air". The cooling system is further arranged to extract hot air, which is vented, for example by fans in the computing devices, from the backs of the rows of cabinets via the "hot aisles". For example, as shown in FIG. 1B, hot air may flow in a direction towards one end of the rows as shown by arrows shaded as "hot air".

In practice, when storage cabinets for computer devices are arranged in rows, the computer devices in each row of cabinets are connected to the same communications cabling, and thus part of the same system network. However, it is not usually possible to provide cabling between adjacent rows of cabinets, for practical reasons and/or design considerations, and so computer devices in adjacent rows of cabinets are typically connected to different network segments of the system network.

Computer systems require continuing management for maintenance and to remedy faults giving rise to operational and/or performance errors. For this purpose, individual computer devices, such as servers, may include "diagnostic tools", typically comprising automated diagnostic monitoring, which may identify errors or events based on diagnostic information. An identified error or event may be indicated to an operator, for example by means of a display on the front panel of the computer device. For instance, a particular light, such as an indicator LED, on the front panel of the computer device may be lit in particular manner to indicate a certain type of error.

In addition, more advanced diagnostic tools may report identified errors in computer devices as "events" to a local or remote management apparatus or console, by sending management data, for example as an "event message" including associated error and diagnostic information, over a management network. In particular, a so-called Advanced System Management module (also known as System Management Interface) may be provided in each computer device (e.g., server) for diagnostic monitoring and reporting using proprietary communications and messaging formats. Such advanced diagnostic monitoring enables a fault or other problem to be identified by an operator of a management device or console at a remote location, and, in some cases, may allow for the fault or problem to be fixed or otherwise resolved remotely. In order to provide such advanced diagnostic functionality, each computer device needs to be able to connect to a management network for reporting events to the management console. However, if a fault exists in the connection of a computer device to the system network, the computer device is unable to connect to the management network via the system network. In order to address this issue, conventional network configurations provide a second system network to provide redundancy (hereinafter called "redundant network"), as shown in FIG. 2A and described below. In this way, if a computer device is unable to connect to the system network, the computer device is able to report the fault as an event over the redundant network to the management console.

FIG. 2A shows a conventional network configuration for a part of the computing system of FIGS. 1A and 1B. FIG. 2A comprises computer devices of a first row 12, computer devices of a second row 14, and aisle 16 between the first row 12 and the second row 14, where the computer devices are depicted as servers. Each server of the first row 12 is connected to a first network switch X for the network segment of the system network (shown in solid line in FIG. 2A). In addition, each server of the first row 12 is connected to a second network switch Y, providing a redundant network (shown in dashed line in FIG. 2A). Similarly, each server of the second row 14 is connected to corresponding first and second network switches X and Y associated with the system network and the redundant network, respectively. Thus, as shown in FIG. 2A, the provision of a redundant network requires an additional network switch Y for each segment and additional cabling to each computer device, which may clutter the storage cabinets in each row, increase energy consumption and reduce heat dissipation, as well as increase infrastructure costs. In FIG. 2A, the first and second network switches X and Y are connected to a management console 70 via a system network 65.

SUMMARY

The present invention provides a method and associated system and computer program product. A first computer device identifies a notifiable management event relating to the first computer device, wherein the first computer device is unable to notify a management device of the notifiable management event via a management network because the first computer device is unable to connect to the management network. The first computer device sends, to a second computer device via a broadcast or multicast communication, an event notification of the notifiable management event. The first computer device receives, from the second computer device via a first unicast communication, an acknowledgement of the event notification, wherein the second computer device is able to connect to the management network. The broadcast or multicast communication and the first unicast communication each use a short-range wireless communications technology.

BRIEF DESCRIPTION OF THE DRAWINGS

Example implementations of the present invention will be described below with reference to the following drawings.

DETAILED DESCRIPTION

Figure 1A:
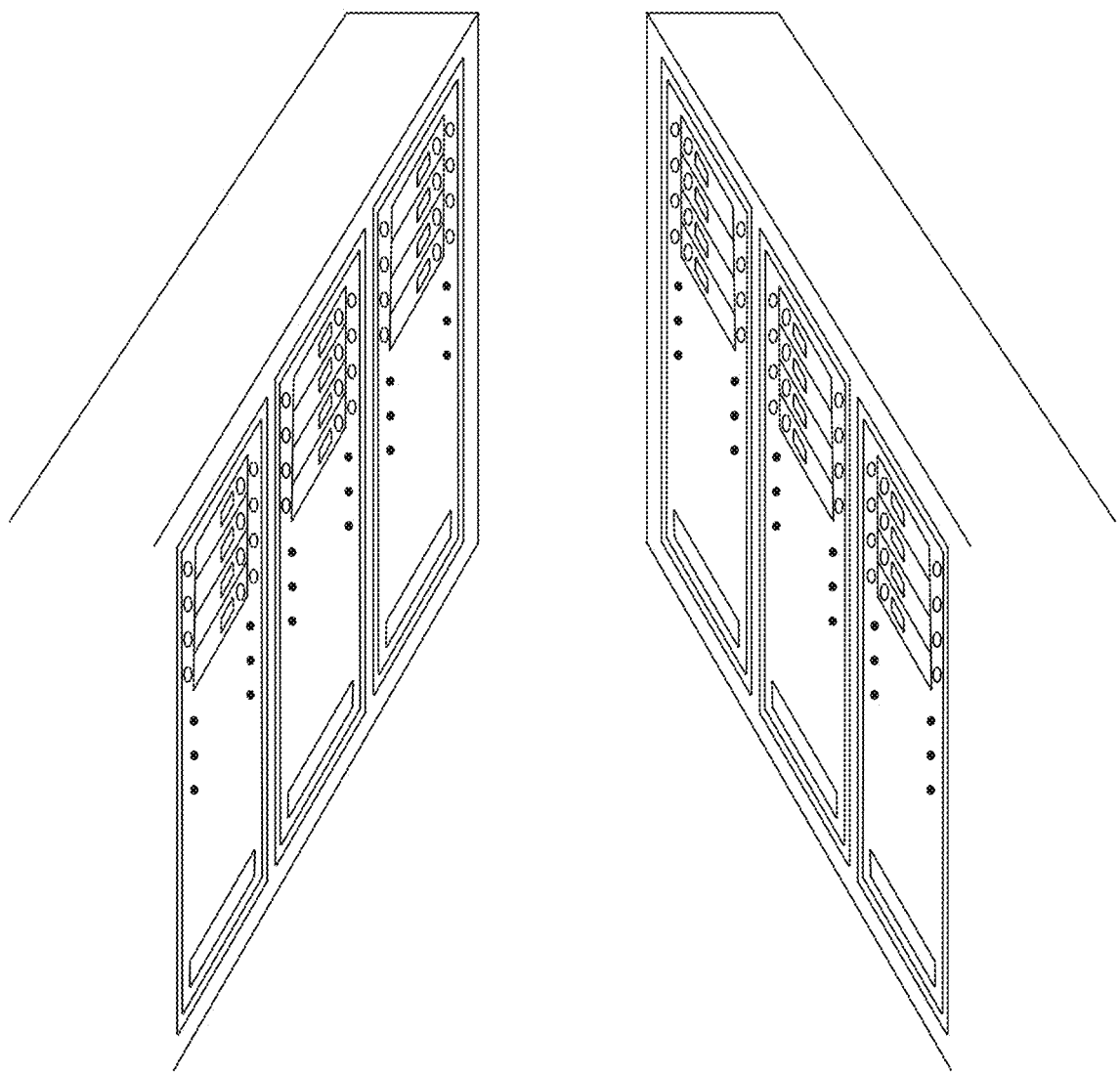
FIG. 1A is a schematic diagram of an arrangement of part of a computing system in a computer room showing an example technology infrastructure design.

Example implementations of the present invention include systems, methods and computer program products for communicating management data, such as the above-described event messages, over a management network to and from a computer device, wherein the computer device is not able to connect to the management network, for example due to a fault in a network connection. The disclosed example implementations may be used for managing computer devices (e.g., servers) in computing systems, for example housed in computing rooms and data centers comprising rows of storage cabinets, in order to reduce, or even eliminate, the need to provide a redundant network. In the drawings, the same or similar features are assigned the same or similar reference numerals.

Figure 3:
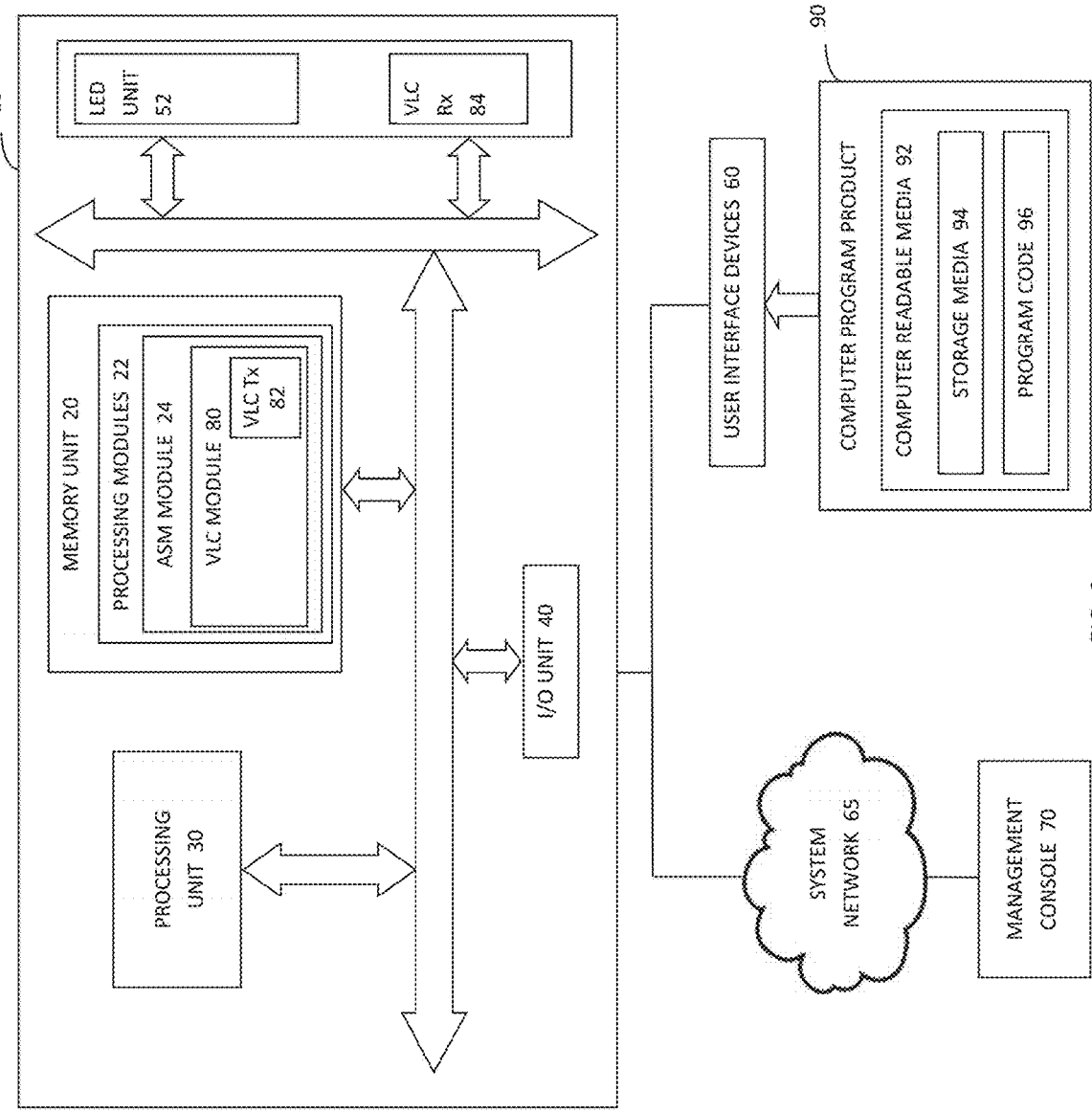
FIG. 3 is a block diagram of a system, in accordance with embodiments of the present invention.

FIG. 3 is a block diagram of a system 1, in accordance with embodiments of the present invention. The system 1 comprises a plurality of computer devices 10, such as servers, only one of which is shown for ease of illustration.

As the skilled person will appreciate, computer device 10 may comprise any other type of device in a computing system capable of diagnostic monitoring. In the example implementation of FIG. 3, computer device 10 comprises a memory unit 20 in communication with a processing unit 30 which represents one or more processors. Memory unit 20 comprises memory, which represents one or more memory units, for storing data for processing by processing unit 30, including processing modules 22 comprising program code for execution by processing unit 30. In particular, in accordance with example implementations of the present invention, memory unit 20 stores an Advanced System Management (ASM) module 24 for monitoring the computing device 10 and obtaining diagnostic information for identifying errors in the operation and/or performance of the computing device 10. As the skilled person will appreciate, the ASM module 24 may comprise any suitable diagnostic tool for collecting management data and identifying errors, which may indicate faults, in the computing device 10, or any associated device connected thereto (not shown). As indicated above, such diagnostic tools, and the processing used to provide the associated diagnostic functions, are well known to the skilled person and so are not described in detail in the present invention. Examples of such diagnostic tools for management of computing systems include: Integrated Management Module (IMM) of IBM Corporation, and Integrated Lights Out (iLO) management interface of Hewlett Packard Enterprise Company.

Computer device 10 further comprises an input/output (I/O) unit 40 and a front-panel unit 50 for communicating data and/or information by computer device 10. In particular, I/O unit 40 may be any suitable communications interface for enabling communication of data by computer device 10 to and from external devices connected thereto. Such external devices include, for example, user interface devices 60 connected via peripheral connections such as USB or Bluetooth connections, and other computer devices 10 of the computing system connected via wired or wireless connections to the system network 65. In addition, such external devices may include other local or remote devices connected via wired or wireless connections to one or more other networks such as a Local Area Network (LAN), a Wide Area Network (WAN) or the Internet, to which computer device 10 is able to connect via the system network 65. An example of such an external device is a management console 70, as discussed in further detail below.

When computer device 10 is able to connect to management console 70 via system network 65, ASM module 24 may send management data, such as event messages and/or diagnostic information, via I/O unit 40 over system network 65 to the management console 70. In addition, ASM module 24 may receive messages from the management console 70, such as requests for diagnostic information or instructions for managing errors (e.g., fixing faults) Diagnostic management processes for such communications between ASM module 24 and management console 70 over network 65, including the (typically proprietary) message formats and communication protocols used, are well known to the skilled person and so are not described in detail in the present invention.

Front-panel unit 50 comprises a Light Emitting Diode (LED) unit 52 including one or more LED indicator lights. For example, LED unit 52 may comprise a plurality of indicator LEDs, which may be illuminated to emit visible light of one or more colors to provide information relating to the computer device 10. For example, a power indicator LED may be lit to emit green light when power is supplied to computer device 10 (i.e., the device is switched on). In addition, ASM module 24 may control one or more of indicator LEDs to emit light of one or more colors to indicate information relating to an operational status of the computer device 10, such as to indicate an error or fault, and, optionally, the severity of the error or fault, that has been identified by ASM module 24.

In accordance with example implementations of the present invention, computer device 10 comprises a wireless communications module 80. In the example shown in FIG. 3, wireless communications module comprises a visible light communications (VLC) module for one-to-many and one-to-one data communication using visible light as a communications medium. As the skilled person will appreciate, in other example implementations, module 80 may implement other types of wireless communications capable of one-to-many and one-to-one data communication, as described further below. In the example implementation shown in FIG. 3, VLC module 80 may be implemented as part of the ASM module 24. As the skilled person will appreciate, VLC module 80 may be implemented as an independent processing module or otherwise, according to design requirements. VLC module 80 enables data to be transmitted from one or more of the indicator LEDs, or a dedicated LED, of the LED unit 52 by visible light communication, such as so-called "Light Fidelity" or "LiFi" in accordance with IEEE 802.15.7-201—IEEE Standard for Local and Metropolitan Area Networks—Part 15.7 entitled: "Short-Range Wireless Optical Communication Using Visible Light". IEEE 802.15.7-2011 defines a PHY and a MAC layer for short-range optical wireless communications using visible light, from 380 nm to 780 nm in wavelength, in optically transparent media. Thus, VLC module 80 may include a VLC transmitter (VLC Tx) 82 for controlling an LED of LED unit 52 to emit light in accordance with a VLC-based PHY modulation scheme. Examples of such modulation schemes include on-off keying (OOK), variable pulse width modulation (VPPM) and color shift keying (CSK) as disclosed in IEEE 802.15.7-2011. As the skilled person will appreciate, some or all of the functionality of VLC transmitter (VLC Tx) 82 may be included with the LED unit 52.

In addition, in accordance with example implementations of the present invention, computer device 10 comprises a wireless communications receiver 84. In the example shown on FIG. 3, the wireless communication receiver comprises a VLC receiver (VLC Rx) 84. VLC receiver 84 comprises a light detecting device, such as a camera, for receiving VLC communications. VLC receiver 84 may also comprise processing functionality to process received VLC communications or such functionality may be provided in VLC module 80. VLC receiver 84 may be included in the front panel unit 50 with LED unit 52, for example as an integrated device, or fitted as a separate device, for example by insertion into a USB port in the front panel of the computer device 10. Data received by VLC receiver 90 may be passed via an internal bus to VLC module 80, thereby enabling bidirectional visible light communication.

In accordance with example implementations of the present invention, when computer device 10 is unable to connect to system network 65, ASM control module 24 nevertheless may send management data, such as event messages and/or diagnostic information, to a management console 70. In particular, in the example implementation of FIG. 3, management data may be sent, by visible light communication, using VLC module 80, VLC transmitter 82 and LED unit 53, to a proxy computer device 10' (e.g., server 10' shown in FIG. 2B) that is able to connect to the system network 65, and thus to the management console 70. In addition, ASM control module 24 may receive messages from the management console 70, such as requests for diagnostic information or instructions for managing errors (e.g., fixing faults), by visible light communication, using VLC receiver 90 and VLC module 80 from the proxy computer device 10'. Example implementations of methods for communicating management data by wireless communication, such as visible light communication, in accordance with the present invention, which may be performed by a first computer device 10 that is unable to connect to a system network 65 and a second, proxy computer device 10' that is able to connect to the system network 65 are described below with reference to FIGS. 4, 5 and 6.

In example implementations of the present invention, a computer program product 90 may be provided, as shown in FIG. 3. The computer program product 90 may include computer readable media 92 having storage media 94, which may include one or more hardware storage devices in one embodiment, and program instructions 96 (i.e., program code) stored on the storage media 94. The program instructions 96 may be loaded onto a memory unit 20 of computing device 10, for example as the above-described ASM module 24 and/or VLC module 80, which may include modules associated with the VLC transmitter 82 and VLC receiver 84. The program instructions 96 may be executable by the processing unit 30 of the computing device 10 to perform processing as described below with reference to FIGS. 4, 5 and 6.

Figure 4:
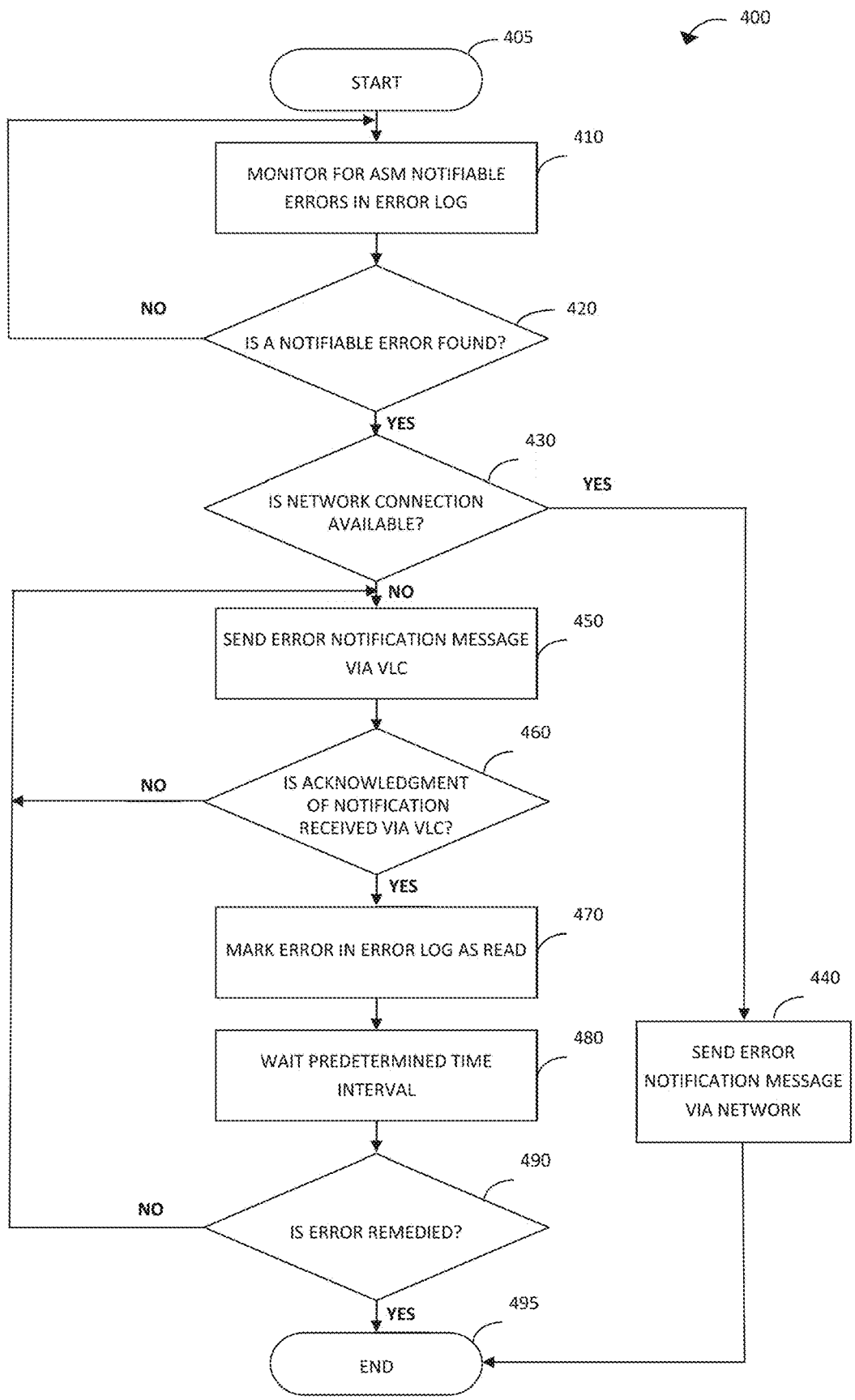
FIG. 4 is a flowchart illustrating a method for communicating management data, in accordance with embodiments of the present invention.

FIG. 4 is a flowchart illustrating a method 400 for communicating management data, embodiments of the present invention. The method 400 uses wireless communication, in particular visible light communication. In particular, although n exclusively, the method 400 may be performed by the ASM module 24 in conjunction with the VLC module 80, VLC transmitter 82 and VLC receiver 84 of a computer device 10, as shown in FIG. 3, when the computer device 10 is not able to connect to a system network 65, and thus is unable to communicate management data to a management console 70.

The method 400 starts at step 405. At step 410, the method optionally monitors for an error or event that is notifiable to an operator, for example an operator of remote management console 70. As described above with reference to FIG. 3, computer device 10 may include a diagnostic tool that performs advanced diagnostic monitoring, for example using ASM module 24, in accordance with known techniques. Such diagnostic tools, and associated diagnostic monitoring techniques, may maintain an error log of identified errors or and define certain types of errors that should be notified as events to an operator. Thus, step 410 may involve periodically scanning an error log for errors that are notifiable. However, other techniques for monitoring for notifiable events are possible and contemplated by the present invention.

At step 420, the method determines whether a notifiable error or event has been identified. If no notifiable error is identified, the method returns to step 410. If a notifiable error is identified, the method continues with step 430 which determines whether a network connection to a management console is available. As described above, errors and faults may be reported by diagnostic tools in a computer device of a computing system to a remote management console over a system network. However, if a fault arises, a computer device may be unable to connect to the system network, and thus unable to report the fault to a management console via the system network. If step 430 determines that a network connection is available, for example because the error does not compromise the connection or there is a redundant network connection, the method proceeds to step 440 by transmitting an error notification message via the network, in accordance with conventional techniques. The method then ends at step 495. However, if step 430 determines that a network connection is not available, for example because the error has compromised the connection to the system network, the method proceeds to step 450. At step 450 the method transmits an error notification by visible light communication, such as LiFi, as a "VLC event message". For example, VLC transmitter 82 of VLC module 80 of the computer device 10 of FIG. 3 may control an indicator LED, of LED unit 52, to emit light so as to communicate data, comprising the VLC event message, for example in accordance with the IEEE 802.15.7-2011 standard.

As described above, computer rooms typically store computer devices in storage cabinets arranged in rows, in which pairs of rows of storage cabinets are arranged with their fronts facing into an aisle, as shown in FIG. 1. Thus, a front panel of a first computer device 10 in a storage cabinet in a first row faces front panels of second computer devices 10' in an opposite storage cabinet in a second, adjacent row across an open aisle (i.e., an optically transparent region).

In example implementations of the present invention, in step 450, first computer device 10 may broadcast the VLC event message and one or more second computer devices 10' opposite the first computer device 10, which are located in an optical path of the visible light carrying the VLC event message, may receive the VLC event message by means of respective VLC receivers 84. In this case, if more than one second computer device 10' receives the VLC event message, a method for one of the second computer devices 10' to take ownership of the data communication, and thus handle the VLC event message, is desirable, in order to avoid duplication of data handling. Examples of such techniques are described below with reference to FIG. 5. In further example implementations, the optical path of the visible light emitted from each first computer device 10 may be controlled, so that the visible light carrying the broadcast VLC event message is incident on only one or a few selected opposite second computer devices 10'. For example, a shield, lens or other optical device may be provided with the LED of each first computer device 10, to control the dispersion of the visible light carrying the VLC event message emitted by the LED so that the visible light is incident on only selected VLC receivers of second computer devices 10'. As the skilled person will appreciate, such a light control device may be provided with the VLC receivers 84 of the second computer devices 10'. In yet further example implementations, only selected second computer devices 10' are configured to receive or handle broadcast VLC event messages. Various combinations of the above-mentioned techniques for handling a broadcast VLC event message are possible and contemplated by the present invention. In other example implementations of the present invention, in step 450, first computer device 10 may transmit the VLC event message to one or more target second computer devices 10' by multicast communication. In particular, the VLC event message may include an identifier (e.g., serial number or code) of each of the target second computer devices 10' as the destination devices. In any of the above cases, the second computer device 10' handling the VLC event message may send a unicast acknowledgement of the VLC event message by visible light communication, as described in more detail below.

At step 460, the method determines whether an acknowledgement of the VLC event message has been received within an acknowledgment time interval (e.g., about 1 second). If step 460 determines that an acknowledgement of the VLC event message has not been received, the method returns to step 450 and repeats the transmission of the VLC event message, either immediately or after waiting a further time period. Such retransmission may be necessary, for example, in the case of a temporary obstruction of the aisle. If step 460 determines that that an acknowledgement of the VLC event message has been received, the method proceeds to step 470.

At step 470, the method records the acknowledgement of the VLC event message by marking the error, corresponding to the event, in the error log to indicate that the error has been read. As the skilled person will appreciate, other techniques for recording that the VLC event message has been acknowledged are possible, and, typically, the technique is selected based on the diagnostic tool, and thus the advanced diagnostic monitoring technique, used. After step 470, the method may end or proceed to step 480 in order to monitor whether the error has been remedied.

In particular, at optional step 480, the method waits for a predetermined time interval, for example during which actions may be taken by the operator to remedy the error associated with the event, for example by fixing an underlying fault. At step 490, the method determines whether the notified error or event has been remedied by actions of the operator or otherwise. For example, step 490 may scan the above-mentioned error log to see whether the status of the error has been reset, e.g., to "normal", or otherwise changed to indicate that the error has been remedied. Other techniques for determining whether the notified error or event has been remedied are possible, and, typically, any technique is selected based on the diagnostic tool, and thus, the advanced diagnostic monitoring technique, used.

If step 490 determines that the notified error or event has been remedied, the method ends at step 495. If, however, the step 490 determines that the notified error or event has not been remedied, the method may return to step 450 and repeats the process of steps 450 to 490 by resending the VLC event message.

As the skilled person will appreciate, various modifications may be made to the method of FIG. 4. For example, the monitoring steps 410 and 420 may be performed by another method (e.g., in a separate processing module 22). Thus, the method may start at step 430 by receiving, from another method, an indication that a notifiable event has been identified. Moreover, step 430 also may be performed by another method (e.g., in the same separate processing module), in which case the method may start step 450 by receiving, from another method, an indication that a notifiable error has been identified that cannot be sent via the system network in accordance with conventional techniques. In addition, while FIG. 4 has been described in relation to notifiable events relating to errors, other types of notifiable events are possible and contemplated. For example, a notifiable event may require the reporting of diagnostic management data at predetermined time intervals.

As the skilled person will appreciate, the method of FIG. 4 enables a first computer device 10 of a computing system that is unable to connect to a system network 65 to nevertheless send event messages to a management device or console 70 using a second computer device 10' that is able to connect to the system network. The second computer device 10' may then act as an intermediary or proxy for the first computer device 10, for example using the method of FIG. 5 described below. In this way, an operator of the management console 70 may be alerted to a problem associated with the event message. The operator may be able to use the event message to identify the first computer device, including its location, and dispatch on-site maintenance staff to manually remedy the problem. Moreover, in example implementations of the present invention, the operator of the management console 70 additionally may be able to attempt to remedy a problem associated with the event message remotely, over the management network 65, using a second computer device 10' as an intermediary or proxy, for example as described below with reference to FIG. 5.

Figure 5:
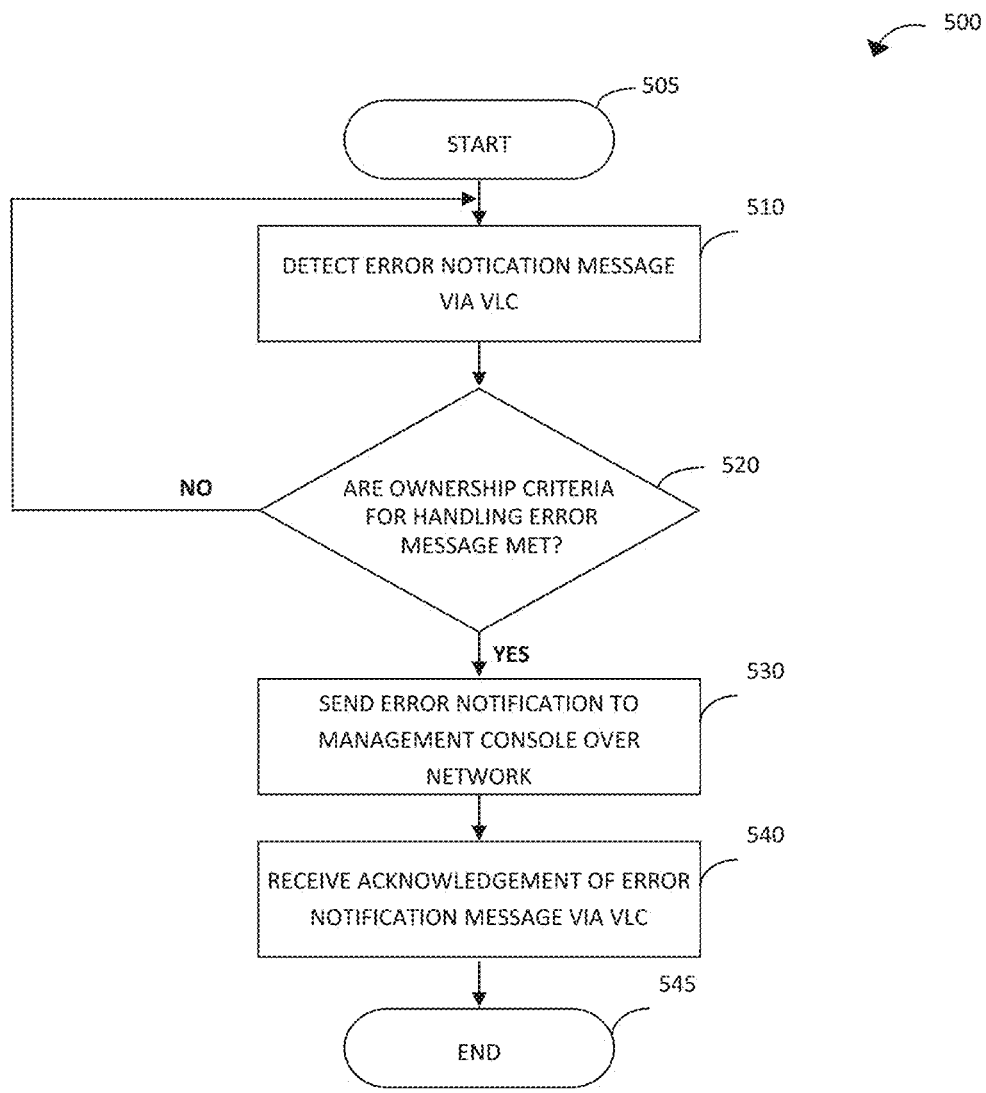
FIG. 5 is a flowchart illustrating a method for communicating management data, in accordance with embodiments of the present invention.

FIG. 5 is a flowchart illustrating a method 500 communicating management data, in accordance with embodiments of the present invention. The method 500 uses wireless communication, in particular visible light communication. In particular, although not exclusively, the illustrated method may be performed by the ASM module 24 in conjunction with the VLC module 80, VLC receiver 84 and VLC transmitter 82 of a computer device 10 as shown in FIG. 3 when the computer device 10 is able to connect to a system network 65 and thus is able to communicate management data to a management console 70. In particular, the method may be performed by a second computer device 10', as described above, in response to receiving a VLC event message from an opposite first computer device 10 that is not able to connect to system network 65, for example using the method described above with reference to FIG. 4. In accordance with the illustrated method, the second computer device 10' effectively acts as a proxy for communications between the first computer device 10 and a management device or console 70 connected to the system network 65 (i.e., communications over a management network). Accordingly, for ease of understanding, second computer device 10' is also referred to herein as "proxy computer device", and first computer device 10 is also referred to herein as "originating computer device".

The method 500 starts at step 505. At step 510, the method detects an error notification, for example in the form of a VLC event message, received by visible light communication. For example, a VLC receiver 84 of second computer device 10' may receive data comprising a VLC event message, as described above, from a first computer device 10 and forward the data via an internal bus to VLC module 80 for processing.

At optional step 520, the method determines whether the second computer device 10' should handle the VLC event message, and thus act as a proxy computer device, for example by determining whether ownership criteria are met. In example implementations of the present invention, the method may determine whether to handle the VLC event message based on an identifier (e.g., serial number or code) of the first computer device 10 included in the VLC event message. For example, the VLC module 80 of each second computer device 10' may store a list of identifiers of first computer devices 10, located in an opposite storage cabinet, for which it is designated to handle VLC event messages, and may take ownership of VLC event messages originating only from those first computer devices 10. In other example implementations, the VLC module 80 of the second computer device 10' may use a random time period algorithm to determine whether to take ownership. Thus, for example, each VLC module 80 may wait a random period of time and then check that the VLC event message remains pending (i.e., has not been cancelled or acknowledged, as described below) before taking ownership. In this way, when a broadcast VLC event message is received by more than one second computer device 10', the VLC module 80 of the second computer device 10' with the shortest random time period will take ownership, and thus act as proxy. As the skilled person will appreciate, other suitable methods or criteria for determining whether second computer device 10' should handle the VLC event message are possible and contemplated by the present invention.

In addition, as described above, in cases where second computer devices 10' are configured so that only one or a few second computer devices 10' are able to receive and/or handle VLC event messages from first computer devices 10 in an opposite storage cabinet, step 520 may automatically determine that the second computer device 10' should handle the data communication, or, alternatively, step 520 may be omitted. In the case that multiple second computer devices 10' initially take ownership and handle a received VLC event message, which may be recognized by the management console 70 which may decide which of the second computer devices 10' to use for further communication (if required), and notify the second computer devices 10', accordingly.

If step 520 determines that the second computer device 10' should not handle the VLC event message, the method returns to step 510. However, if step 520 determines that the second computer device 10' should handle the VLC event message, the method proceeds to step 530 by acting a proxy and handling the VLC event message. In particular, at step 530 the method sends an error notification, for example in the form of an event message, corresponding to the VLC event message to a management console 70. For example, since proxy computer device 10' is able to connect to system network 65, ASM module 24 may send an event message via I/O unit 40 over the system network 65 to the management console 70.

At step 540, the method may send an acknowledgement of the VLC event message to the originating computer device 10 by unicast communication using visible light communication. Such an acknowledgement may correspond to the acknowledgement received at step 440 of the method of FIG. 4, described above. In example implementations of the present invention, step 540 may be performed before or concurrently with step 530. In other example implementations, step 540 may be performed after the proxy computer device 10' receives an acknowledgement of the event message, sent at step 530, from the management console 70. After step 540, the method ends at step 545.

As the skilled person will appreciate, the method of FIG. 5 enables a second computer device 10' that is able to connect to the system network 65 to handle management communications on behalf of a first computer device 10 that is not able to connect to the system network, and so not capable of directly communicating with a management console 70 over the system network 65. In examples implementing optional step 520, the method may further ensure that when multiple second computer devices 10' receive a VLC event message, arbitration is performed to determine which second computer device 10' should take responsibility or ownership for handling the VLC event message. In this way, the duplication of processing of the same VLC event message by multiple second computer devices 10', and corresponding duplication of data traffic on the system network 65 and processing by the management console 70, is mitigated.

Figure 6:
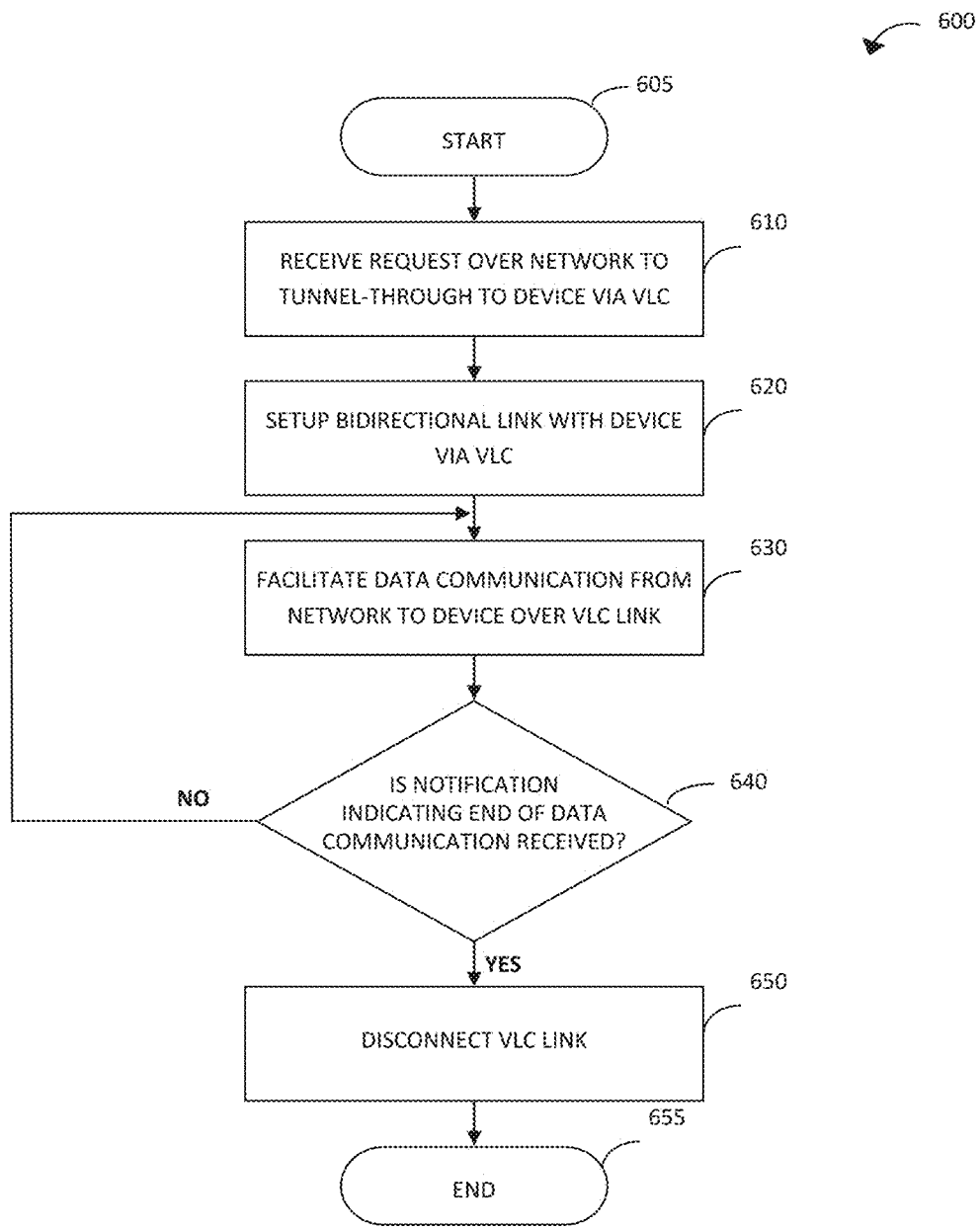
FIG. 6 is a flowchart illustrating a method for facilitating bidirectional communication of management data, in accordance with embodiments of the present invention.

FIG. 6 is a flowchart illustrating a method 600 for facilitating bidirectional communication of management data, in accordance with embodiments of the present invention. The method 600 communicates management data using wireless communication, in particular visible light communication. In particular, although not exclusively, the illustrated method may be performed by the ASM module 24 in conjunction with the VLC module 80, transmitter 82 and VLC receiver 84 of a computer device 10 as shown in FIG. 3, when the computer device 10 is able to connect to a system network 65 and thus is able to communicate management data to a management console 70, and receives and handles a VLC event message from an opposite computer device 10 that is not able to connect to system network 65. In particular, the method may be performed by a proxy second computer device 10', as described above, in response to receiving a VLC event message from an opposite first computer device 10 that is not able to connect to system network 65, for example using the method described above with reference to FIG. 5.

The method 600 starts at step 605. At step 610, the method receives a request for a tunnel-through, bidirectional connection to the first computer device 10 that sent the error notification in the form of a VLC event message, by visible light communication. For example, the request may be received from a management console 70 over the management network 65, in accordance with proprietary communication and message formats, and may include a request to establish a bidirectional visible light communication connection with the first computer device 10. The request may include an identifier for the first computer device 10 and may further include instructions for an ASM module 24 of the first computer device 10 to perform processing, for example to remedy or otherwise address an error associated with the notified event.

At step 620 the method establishes a bidirectional connection by visible light communication with the originating computer device 10. For example, the VLC module 80 may drive an LED of the LED unit 52 of proxy computer device 10' to transmit a unicast VLC request message identifying the originating computer device 10 and including, for example, a handshaking request to set-up a bidirectional VLC link, in accordance with IEEE 802.15.7-2011 standard, such as a bidirectional LiFi link as discussed above. In response, the VLC receiver 84 of proxy computer device 10' may receive a VLC response message from the originating computer device 10 including, for example, a handshaking response and/or acknowledgement, in order to set-up the bidirectional VLC link. The bidirectional connection may be established using standard tunneling techniques, for example secure shell tunneling to provide a secure, encrypted tunnel for the exchange of management messages and data. As the skilled person will appreciate, any suitable message format and communication protocol may be used for establishing the bidirectional VLC link, which, typically, may depend on the type of visible light communication employed for a particular application.

Following establishment of a bidirectional VLC link at step 620, the method proceeds to step 630 by facilitating communication of management data between the management console 70 and the originating computer device 10 via the bidirectional VLC link. In particular, the ASM control module 24 of proxy computer device 10' may receive management request messages from management console 70 via system network 65 and pass them on to VLC module 80 for sending from LED unit 52 to originating computer device 10 via the VLC link. Similarly, the VLC module 80 of proxy computer device 10' may receive management response messages from originating computer device 10 at VLC receiver 84 via the VLC link and pass them on to the ASM module 24 for forwarding to management console 70 via system network 65. As the skilled person will appreciate, various types of management messages and data may be communicated in step 630 in accordance with the (typically proprietary) management processes used for diagnostic monitoring and management of the computer system, as implemented in the ASM module 24 and the management console 70 in a particular application.

At optional step 640, the method determines whether data communication between the management console 70 and originating computer device 10 should be terminated, for example by determining whether a notification indicating the end of the data communication has been received. Such a notification may be received from the management console 70, the originating computer device 10 or both, depending upon the management processing used. In example implementations, the notification may include a message that indicates the end of data communication, such as denoting the resolution of an error that gave rise to the event. In other example implementations, the notification may comprise an explicit message to terminate communication, and, thus, disconnect the VLC link. If step 640 determines that a notification indicating the end of data communication has not been received, the method returns to step 630 and data communication continues at step 630. However, if step 640 determines that a notification indicating the end of data communication has been received, the method continues to step 650 by disconnecting the VLC link. The method then ends at step 655. As the skilled person will appreciate, data communication may end without any explicit notification from the management console or originating computer device, and step 640 may be omitted. For example, the originating computer device and/or the proxy computer device may cease communication of management data at step 630. The VLC link may then be terminated automatically at step 650, and the method may end at step 655 in response thereto.

As the skilled person will appreciate, the method of FIG. 6 uses a second computer device 10' that is able to connect to the system network 65 to act as proxy for a first computer device 10 that is notable to connect to the system network and so not capable of communicating with the management console 70 over the system network 65. In particular, the second computer device 10' is able to communicate with a management console 70 on the management network via the system network 65 as well as communicating with first computer devices 10 by visible light communication. Thus, the method enables an operator of the management console 70 to receive event notifications, relating to a first computer device 10 that is unable to communicate with the management console 70 via the system network 65, transparently, i.e., in the same way as they would be received if the first computer device 10 were able to connect to the management network. Similarly, the method enables an operator of the management console 70 to send instructions to a first computer device 10, to assist in remedying any identified problems, transparently, i.e., in the same way as they would be sent if the first computer device 10 were able to connect to the system network.

Figure 2A:
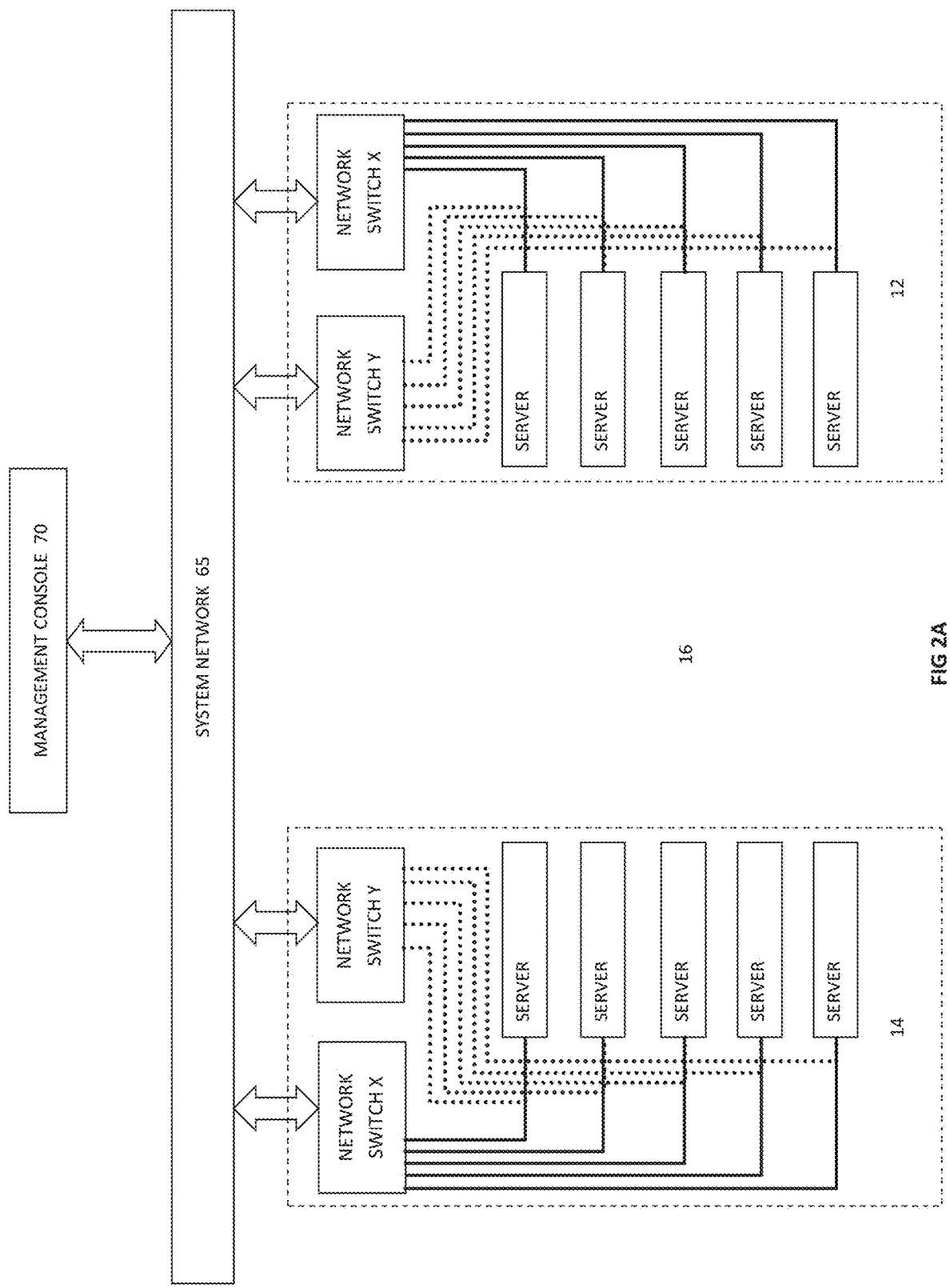
FIG. 2A is a schematic block diagram showing a conventional network configuration for a part of the computing system of FIGS. 1A and 1B.

Accordingly, example implementations of the present invention enable computer devices 10 of a computing system to communicate management data to a management device or console 70 when the computer devices 10 are unable to connect to the system network 65, which avoids the need to provide a second network for redundancy as described above in relation to FIG. 2A. In consequence, the network cabling infrastructure required may be reduced, leading to a reduction in energy consumption, reduced cabling in the storage cabinets and consequential improvements in heat dissipation.

Figure 1B:
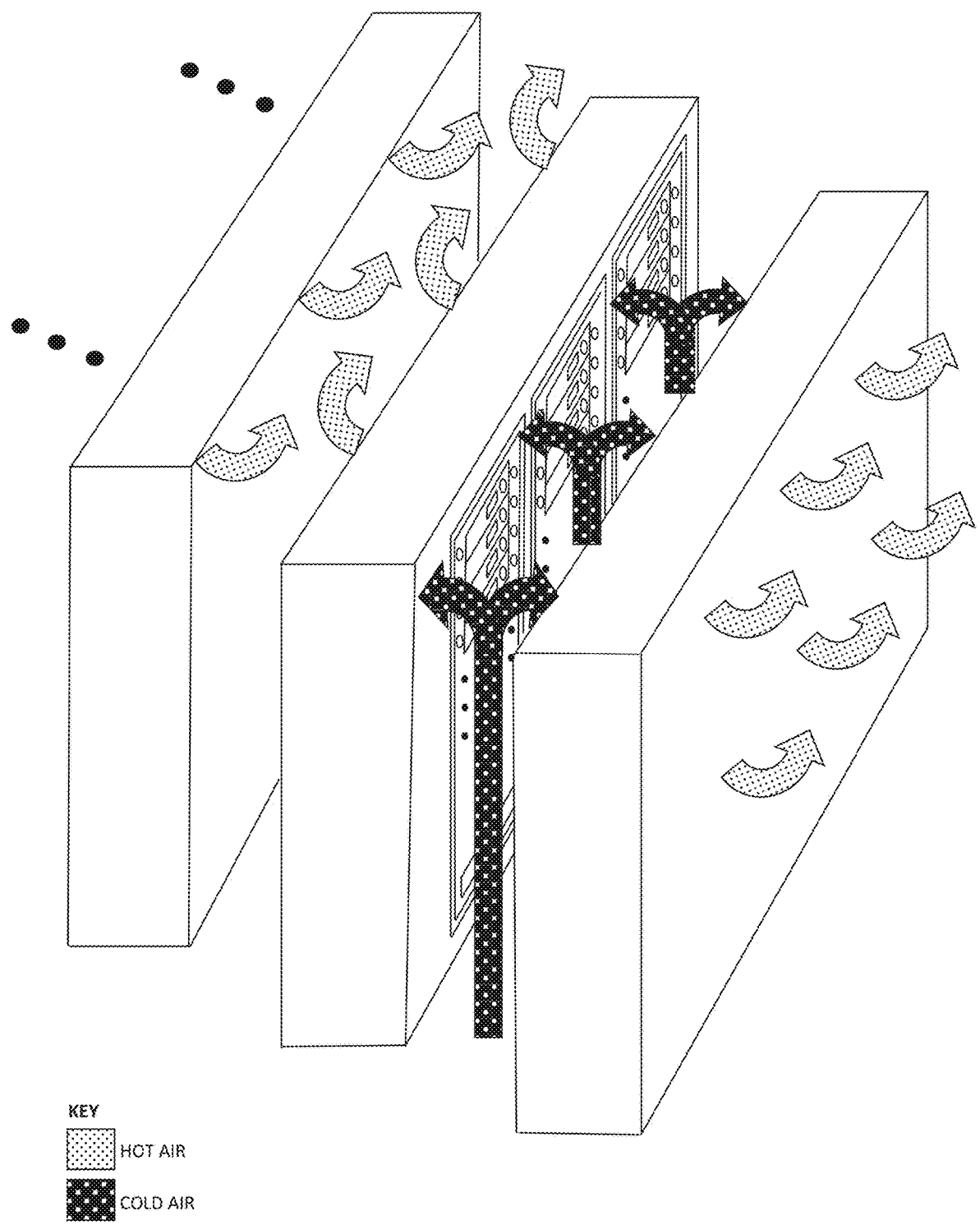
FIG. 1B is schematic diagram of an arrangement of part of a computing system in a computer room showing an example general infrastructure design.
Figure 2B:
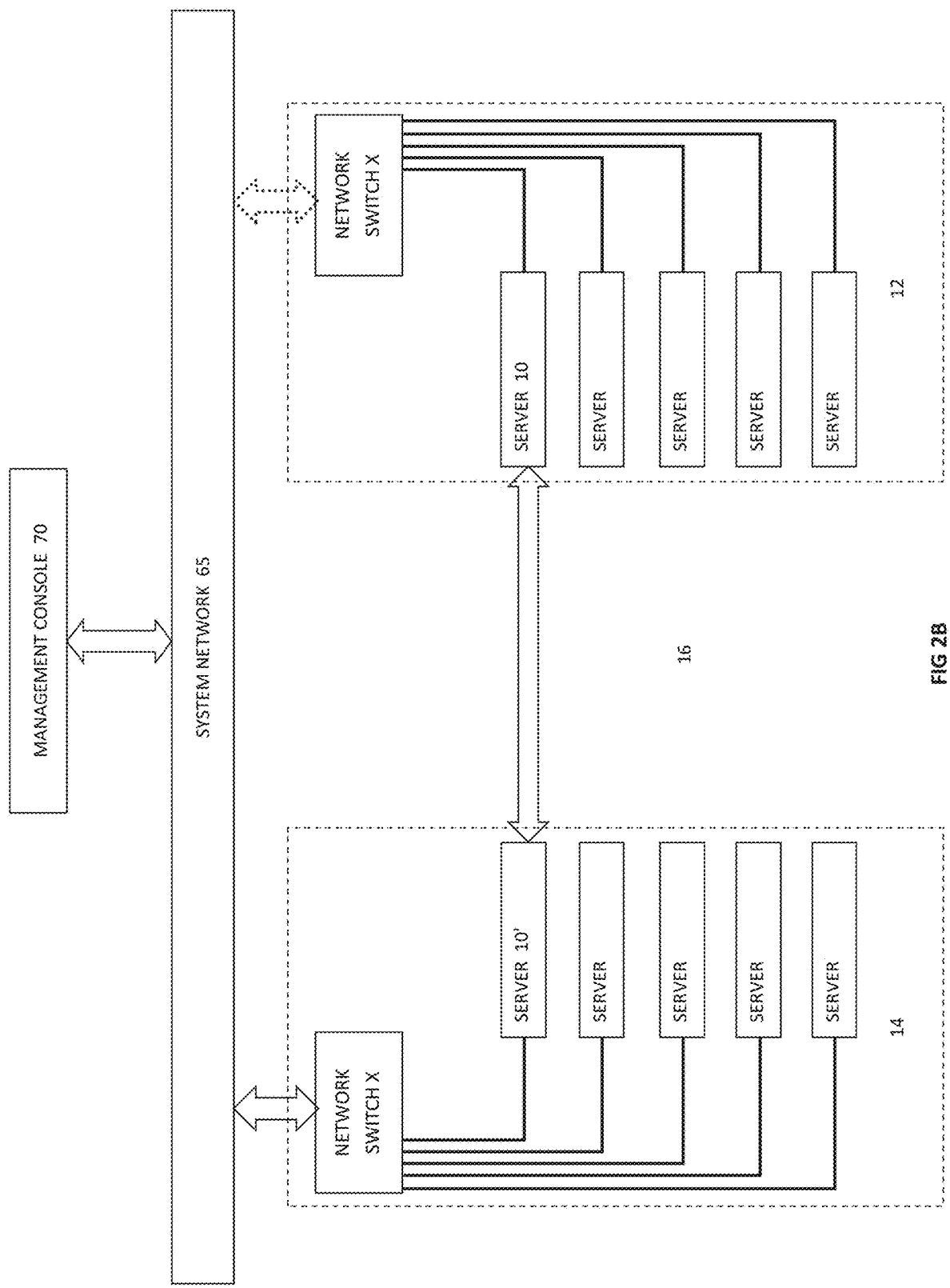
FIG. 2B shows a network configuration for a part of the computing system of FIGS. 1A and 1B, in accordance with embodiments of the present invention.

In particular, FIG. 2B shows a network configuration for a part of the computing system of FIGS. 1A and 1B, in accordance with embodiments of the present invention. As shown in FIG. 2B, computer devices of a first row 12 and computer devices of a second row 14 are depicted as servers 10. Each server of the first row 12 is connected to a single network switch X for the network segment of the system network, and each server of the second row 14 is connected to single network switch X for the network segment of the system network. In the event that a server 10 in the first row 14 detects a fault, but is unable to connect to the system network 65, for example due to a fault with the connection to network switch X, an event message may be communicated to a management console 70 via a proxy computer device 10'. In particular, the server 10 may broadcast a VLC event message across an aisle 16 to the opposite servers 10 in the second row 14, and a server 10' in the second row 14 may send an acknowledgement of the VLC event message to the server 10 by visible light communication, for example using the method described above with reference to FIG. 4. As shown in FIG. 2B, a bidirectional VLC link (as shown by the arrow in FIG. 2B) may be established between the server 10 in the first row 12 and the server 10' in the second row 14 to enable server 10 to communicate with management console 70 via the VLC link and system network 65, with the server 10' as proxy, for example using the method described above with reference to FIG. 6.

Figure 7:
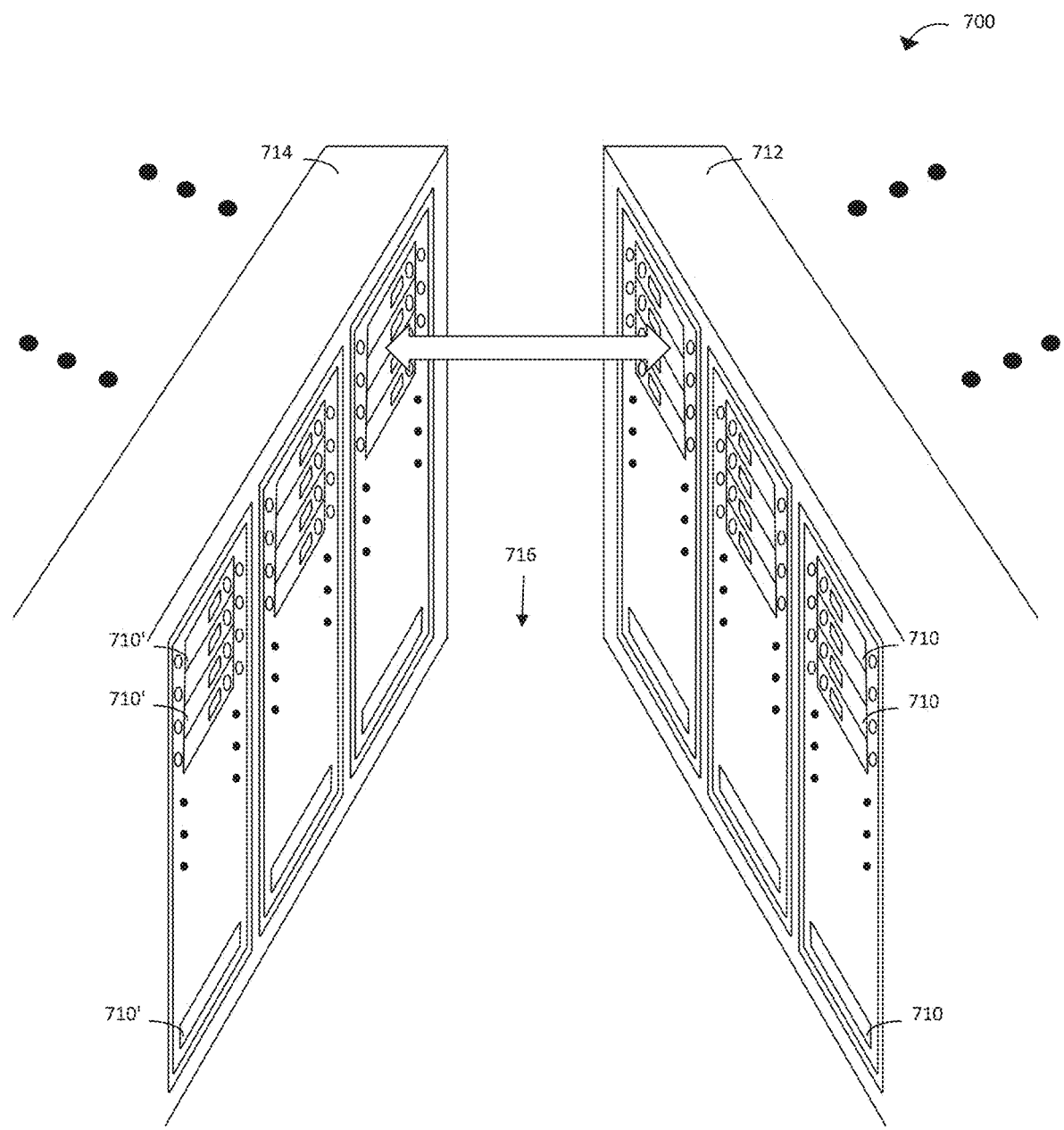
FIG. 7 is schematic diagram of an arrangement of part of a computing system in a computer room, in accordance with embodiments of the present invention.

FIG. 7 is a schematic diagram of an arrangement of part of a computing system in a computer room, in accordance with embodiments of the present invention. The computing system 700, which may correspond to the computing system of FIG. 3, comprises first and second rows of storage cabinets 712, 714 positioned opposite each other with their fronts facing into an aisle 716. For ease of illustration, only two rows of cabinets 712, 714 are shown. A plurality of first computer devices 710 (analogous to computer devices or servers 10 in FIG. 2B) are stored in the first row of storage cabinets 712. The first computer devices 710 may be connected a first segment of system network, for example as in the network segment of the servers in row 12 of FIG. 2B. A plurality of second computer devices 710' (analogous to computer devices or servers 10' in FIG. 2B) are stored in the second row of storage cabinets 714. The second computer devices 710' may be connected to a second segment of system network, independent of the first network segment, for example as in the network segment of the servers in row 14 of FIG. 2B.

In example implementations of the present invention, each of the first computer devices 710 in the first row of storage cabinets 712 and each of the second computer devices 710' in the second row of storage cabinets 714 may be configured for visible light communication. Thus, visible light communication may take place between each of the first computer devices 710 and the second computer devices 710' across the aisle 716, which provides optically transparent media for the communication of visible light. In example implementations of the present disclosure, first computer devices 710 in the first row of storage cabinets 712 and second computer devices in the second row of storage cabinets 714 may be configured to send broadcast or unicast data communications by visible light communication, and, thus, may be configured to perform the method of FIG. 4. In example implementations of the present invention, one or more of the plurality of second computer devices 710 in the second row of storage cabinets 714 may be selectively configured to receive and/or handle data communications by visible light communication with a predetermined subset of the plurality of first computer devices 710 in the first row of storage cabinets 712 substantially opposite thereto, and thus may be configured to perform the method of FIG. 5 and/or FIG. 6. In example implementations of the present invention, one or more of the plurality of first computer devices 710 in the first row of storage cabinets 712 may be selectively configured to receive and/or handle data communications by visible light communication from a predetermined subset of the plurality of second computer devices 710' in the second row of storage cabinets 714 substantially opposite thereto, and thus may be configured to perform the method of FIG. 5 and/or FIG. 6.

As the skilled person will appreciate, various modifications and changes may be made to the infrastructure design arrangement of the computing system of FIG. 7, in accordance with example implementations of the present invention. For example, one or more VLC receiver device, independent of the computer devices, may be provided for receiving a VLC event message. For example, a VLC receiver connected to the system network may be provided at a location adjacent an aisle between the fronts of storage cabinets, and positioned within optical paths to receive visible light communications from LEDs of the first and/or second computer devices Thus, in example implementations, VLC receiver devices may be positioned at a location above, below or adjacent the aisle, and visible light from LEDs of the first computer devices may be directed (e.g., by optical devices as described above and/or mirrors at appropriate infrastructure locations) towards one or more of the VLC receiver devices. Such receiver devices may include a processing unit configured for processing and handling event messages using processes similar to the method described above in relation to FIG. 5. In addition, receiver devices may also be provided with an LED and VLC transmitter, to enable bidirectional visible light communication as described above in relation of FIGS. 5 and/or 6.

As the skilled person will appreciate, the described example implementations of the present invention provide short range wireless communication using visible light communication. Other types of wireless communication, already known and that may be developed in the future, which are capable of at least one to many communication (i.e., broadcast/multicast), and preferably also one to one communication (i.e., unicast) are possible and contemplated. For example, alternative example implementations may use data over audio communication techniques, such as so-called "LISNR technology" developed by LISNR, Inc. of Cincinnati, Ohio. LISNR technology implements a communication protocol based on high frequency, inaudible sound signals as described, for example in International Patent Publication No. WO-A-2013/166158. LISNR technology provides for one to many (broadcast/multicast) communication, and may be implemented for bidirectional one to one (unicast) communication by means of a pair of unidirectional communication links. In examples implementing LISNR communication technology, each computer device may include a suitable LISNR transmitter (e.g., loudspeaker and LISNR communications interface) and a suitable LISNR receiver (e.g., microphone and LISNR communications interface), in place of the VLC module, VLC transmitter and VLC receiver of the example implementations described above. As the skilled person will appreciate, other suitable types of wireless communication are possible and contemplated.

Whilst the above description relates to the communication of management data, relating to computer devices of a computing system, to and from a management console on a management network, the techniques disclosed herein may be used to communicate other types of data that need to be sent from other types of device on other separate networks that may be connected to a system network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:
    sending, by a first computer device to a second computer device via a broadcast or multicast communication, an event notification of a notifiable management event, wherein the first computer device may connect to a management network via only a first network switch, wherein the first computer device is unable to notify a management device of the notifiable management event via the management network because the first computer device is unable to connect to the management network via the first network switch, wherein the first computer device and the second computer device are physically separated by an aisle;
    receiving, by the first computer device from the second computer device via a first unicast communication, an acknowledgment of the event notification, wherein the second computer device is able to connect to the management network via the second network switch,
    wherein the broadcast or multicast communication and the first unicast communication each use a short-range wireless communications technology comprising visible light communication or data-over-audio communication.

2. The method of claim 1, wherein a first row of computer devices comprise the first computer device, wherein a second row of computer devices comprise the second computer device, and wherein the first row of computer devices and the second row of computer devices are physically separated by the aisle.

3. The method of claim 2, wherein each computer device in the first row may connect to the management network via only the first network switch.

4. The method of claim 2, wherein the first computer device is opposite the first computer device across the aisle.

5. The method of claim 1, said method further comprising:
    maintaining, by the first computer device, a log of management events relating to the first computer device, and
    in response to said receiving the acknowledgment of the event notification, recording, by the first computer device, the notifiable management event in the log of management events.

6. The method of claim 1, said method further comprising:
    receiving, by the first computer device from the second computer device via a second unicast communication, data communications that include a management request from the management device on the management network;
    processing, by the first computer device, the management request to provide a management response, and
    sending, by the first computer device to the second computer device via a third unicast communication, the management response for forwarding, by the second computer device, the management response to the management device over the management network,
    wherein the second unicast communications and the third unicast communication use the short-range wireless communications technology.

7. The method of claim 1, said method further comprising:
    receiving, by the second computer device from the first computer device via the broadcast or multicast communication, the event notification of the notifiable management event; determining, by the second computer device, that the second computer device should handle the event notification, and in response to said determining that the second computer device should handle the event notification, sending, by the second computer device to the first computer device via the first unicast communication, the acknowledgment of the event notification.

8. The method of claim 7, wherein, prior to said sending the acknowledgment of the event notification, the method further comprises:
    sending, by the second computer device to the management device over the management network, the event notification; and
    receiving, by the second computer device from the management device over the management network, the acknowledgment of the event notification.

9. The method of claim 7, said method further comprising:
    receiving, by the second computer device from the management device over the management network, a management message including a request to establish a tunnel-through bidirectional link with the first computer device for management data communications;
    in response to said receiving the management request, the second computer device setting up a bidirectional unicast communication link with the first computer device, wherein the bidirectional unicast communication uses the short-range wireless communications technology.

10. The method of claim 9, said method further comprising:
    facilitating management data communications between the management device and the first computer device using unicast communication over the bidirectional link.

11. A system, comprising: a first computer device, said system configured to execute a method, said method comprising:
    sending, by the first computer device to a second computer device via a broadcast or multicast communication, an event notification of a notifiable management event, wherein the first computer device may connect to a management network via only a first network switch, wherein the first computer device is unable to notify a management device of the notifiable management event via the management network because the first computer device is unable to connect to the management network via the first network switch, wherein the first computer device and the second computer device are physically separated by an aisle;

receiving, by the first computer device from the second computer device via a first unicast communication, an acknowledgment of the event notification, wherein the second computer device is able to connect to the management network via the second network switch, wherein the broadcast or multicast communication and the first unicast communication each use a short-range wireless communications technology comprising visible light communication or data-over-audio communication.

12. The system of claim 11, wherein a first row of computer devices comprise the first computer device, wherein a second row of computer devices comprise the second computer device, and wherein the first row of computer devices and the second row of computer devices are physically separated by the aisle.

13. The system of claim 12, wherein each computer device in the first row may connect to the management network via only the first network switch.

14. The system of claim 12, wherein the first computer device is opposite the first computer device across the aisle.

15. The system of claim 11, said method further comprising:
maintaining, by the first computer device, a log of management events relating to the first computer device, and
in response to said receiving the acknowledgment of the event notification, recording, by the first computer device, the notifiable management event in the log of management events.

16. A computer program product, comprising one or more computer readable hardware storage devices having computer readable program code stored therein, said program code executable by one or more processors to implement a method, said method comprising:
sending, by a first computer device to a second computer device via a broadcast or multicast communication, an event notification of a notifiable management event, wherein the first computer device may connect to a management network via only a first network switch, wherein the first computer device is unable to notify a management device of the notifiable management event via the management network because the first computer device is unable to connect to the management network via the first network switch, wherein the first computer device and the second computer device are physically separated by an aisle;
receiving, by the first computer device from the second computer device via a first unicast communication, an acknowledgment of the event notification, wherein the second computer device is able to connect to the management network via the second network switch,
wherein the broadcast or multicast communication and the first unicast communication each use a shirt-range wireless communications technology comprising visible light communication or data-over-audio communication.

17. The computer program product of claim 16, said method further comprising:
receiving, by the first computer device from the second computer device via a second unicast communication, data communications that include a management request from the management device on the management network;
processing, by the first computer device, the management request to provide a management response, and
sending, by the first computer device to the second computer device via a third unicast communication, the management response for forwarding, by the second computer device, the management response to the management device over the management network,
wherein the second unicast communications and the third unicast communication use the short-range wireless communications technology.

18. The computer program product of claim 16, said method further comprising:
receiving, by the second computer device from the first computer device via the broadcast or multicast communication, the event notification of the notifiable management event; determining, by the second computer device, that the second computer device should handle the event notification, and in response to said determining that the second computer device should handle the event notification, sending, by the second computer device to the first computer device via the first unicast communication, the acknowledgment of the event notification.

19. The computer program product of claim 18, wherein, prior to said sending the acknowledgment of the event notification, the method further comprises:
sending, by the second computer device to the management device over the management network, the event notification; and
receiving, by the second computer device from the management device over the management network, the acknowledgment of the event notification.

20. The computer program product of claim 18, said method further comprising:
receiving, by the second computer device from the management device over the management network, a management message including a request to establish a tunnel-through bidirectional link with the first computer device for management data communications;
in response to said receiving the management request, the second computer device setting up a bidirectional unicast communication the first computer device,
wherein the bidirectional unicast communication uses the short-range wireless communications technology.

* * * * *